United States Patent [19]

Donley et al.

[11] 4,111,150
[45] Sep. 5, 1978

[54] APPARATUS FOR COATING AN ADVANCING SUBSTRATE

[75] Inventors: Harold E. Donley, Oakmont; William P. Cathers, Allison Park, both of Pa.

[73] Assignee: PPG Industries, Inc., Pittsburgh, Pa.

[21] Appl. No.: 782,132

[22] Filed: Mar. 28, 1977

[51] Int. Cl.² .................. B05B 3/00; B05C 5/00
[52] U.S. Cl. .................. 118/7; 118/323; 65/60 R; 427/424
[58] Field of Search .......... 118/323, 314, 7; 65/60 R, 60 A, 60 C, 60 D; 427/168, 422, 424

[56] References Cited

U.S. PATENT DOCUMENTS

| 2,003,778 | 6/1935 | Willis | 118/314 |
| 2,728,238 | 12/1955 | Paasche | 118/323 X |
| 3,652,246 | 3/1972 | Michelotti et al. | 65/60 R |
| 3,796,184 | 3/1974 | Hawkins | 118/323 |
| 3,885,066 | 5/1975 | Schwenninger | 118/323 |

FOREIGN PATENT DOCUMENTS 1,116,460 6/1968 United Kingdom ............ 118/323

Primary Examiner—Mervin Stein
Attorney, Agent, or Firm—E. Kears Pollock

[57] ABSTRACT

A coating apparatus employing a continuous traveling chain to move coating composition dispensers across a conveyer for coating glass traveling on the conveyer is provided with at least two sets of coating dispensers, all positioned for dispensing coating composition generally normal to a plane in which the chain travels, with the sets of coating dispensers actuated during separate portions of their travel along the path of the traveling chain in order to continuously produce multiple film coatings as the dispensers remain oriented throughout their travel in facing relation to the conveyer.

6 Claims, 12 Drawing Figures

APPARATUS FOR COATING AN ADVANCING SUBSTRATE

CROSS-REFERENCE TO RELATED APPLICATIONS

U.S. Pat. No. 3,660,061 to Donley et al, U.S. application Ser. No. 782,131, entitled "Pyrolytic Deposition of Protective Silica Films" of Donley and U.S. application Ser. No. 782,149, entitled "Abrasion Resistant Coated Window" of Wagner et al are incorporated by reference herein to disclose films and multiple film coatings that may be produced employing the present apparatus. Both pending applications are commonly assigned and filed on even date with this application.

BACKGROUND OF THE INVENTION

This invention relates to the field of coating substrates, such as discrete sheets or continuous ribbons of glass. More particularly, this invention relates to apparatus for dispensing glass coating compositions.

The prior art relating to apparatus for coating glass sheets, plates or like substrates includes U.S. Pat. No. 3,652,246 to Michelotti and Henery and U.S. Pat. No. 3,796,184 to Hawkins. Both of these patents deal with reciprocating spray coating devices for preferred use with a glass producing facility such as a float glass production unit, an annealing lehr or a facility including both. These patents illustrate coating composition dispensers mounted on a carriage which is operatively connected with a continuous traveling chain to reciprocate the carriage back and forth across a glass conveyor.

The prior art further includes British Pat. No. 1,116,460 which discloses a continuous traveling chain device having coating composition dispensers actually connected to the chain to travel about with it rather than merely reciprocating in response to its travel. This patent includes a description of an embodiment which provides dispensers for two coating compositions. However, the device shown in this British patent provides pairs of dispensers aimed parallel to the planes of travel of the chains on which they are mounted. As a result, the dispensers can only be facing a substrate to coat it during half their cycle of travel about the path of the chain.

The disclosure of this British patent also includes a description of one embodiment of a traveling chain device having coating composition dispensers mounted on the chain and oriented to direct coating composition normal to the plane of the traveling chain. Such a device is shown for either a single coating composition feed or individual dispenser tanks to batch feed each dispenser. This embodiment of a coating device does provide a capability to dispense coating composition toward a substrate during both halves of the cycle of travel along the traveling chain.

Nevertheless, the prior art does not provide any means for employing dispensers to continuously receive and dispense a plurality of coating compositions toward a substrate while providing for dispensing of coating composition from some dispensers traveling either half of a cycle along the path of a continuous traveling chain. Thus, the devices of the prior art are limited in capability to fully utilize the space taken by a traveling chain device. This is exemplified by the fact that if two coating compositions were to be applied to a substrate to make a two-film coating, it would be necessary to employ two complete traveling chain devices or to provide a device which failed to use both halves of its traveling cycle to apply coating composition to the substrate.

The present invention comprises an improvement to a device such as described in the British patent wherein dispensers are aimed normal to the plane of the traveling chains. The improvement provides a capability for independently employing plural coating compositions and for continuously delivering coating compositions to moving dispensers.

SUMMARY OF THE INVENTION

A coating apparatus, particularly adapted for coating flat substrates such as discrete glass sheets or plates and continuous sheets or ribbons of glass, is provided. The coating apparatus includes a conveyer for conveying the substrate to be coated past or through a coating station. The conveyer is preferably a roll conveyer although a belt or chain conveyer could be employed. The conveyer is preferably one which conveys glass from a forming chamber to and through an annealing lehr or a conveyer which conveys glass through a furnace and subsequently through an annealing lehr or quenching station. The conveyer is characterized as providing a plane of conveying along which a substrate is conveyed. The conveying plane is preferably horizontal.

The coating device further includes a supporting structure spaced from the conveyer. Mounted on the supporting structure is one or more endless chains on rotatable sprockets which permit the continuous travel of the chains. The chain (or chains) lies in a plane substantially parallel to the conveying plane. The sprockets on which the chain resides are preferably positioned on opposite sides of the conveyor so that the chain extends between the sprockets and lies in two parallel lines spaced from each other a distance equal to the diameter of the sprockets, with both lines being substantially normal to the direction of movement provided along the conveyer during its operation.

A plurality of coating dispensers are mounted on the chain (or chains). Each coating dispenser is mounted so that it faces the conveyer as it travels with the chain between the sprockets. Each dispenser is therefore oriented to dispense a coating composition normal to the planes of the chain and of the conveyer.

Preferred dispensers are spray dispensers to spray atomized liquid coating compositions toward a substrate traveling on the conveyer. Such spray devices dispense a fan or cone-shaped spray. The dispensers are preferably selected to dispense a fan or cone-shaped spray that intersects the substrate to be coated in a circular or elliptical area. The dispensers are preferably sized and mounted at a sufficient distance from the conveyer so that the circular or elliptical areas of spray for coating dispensers passing on opposite paths spaced a chain sprocket diameter from one another do not overlap but rather closely approach one another.

The coating device also includes a facility for continuously distributing fluid coating compositions to the coating dispensers. The fluid distribution facility is rotatable and is centrally disposed with respect to the path of travel of the continuous chain. This permits the distribution facility to move along with coating composition dispensers which are connected to it by flexible conduits. As a result, it is possible to continuously distribute fluid coating compositions to individual coating dispensers that are moving along with the chain back and forth across the conveyer and about the chain sprockets at its sides.

The fluid distribution facility comprises a stacked series of coaxial distribution chambers, each having radial outlets for connection to flexible conduits leading to the coating dispensers. The coaxial distribution chambers are individually connected through rotary unions to fixed inlets for connection to inlet conduits to receive fluid coating composition or atomizing gas or air from remote fluid sources outside the region occupied by the coating device.

The coating device is provided with a motor to synchronously drive both the chain (or chains) on which the dispensers are mounted and the rotatable distribution facility. The motor may be mounted on the supporting structure of the device and connected to the driven parts of the device using any convenient mechanical linkage such as a drive chain or gear drive arrangement. In the embodiment of the invention described in detail here, a drive chain system is employed. Sprocket sizes are chosen to insure synchronous rotation of the fluid distribution facility and movement of the chain mounted dispensers.

The dispensers employed in the coating device are provided with means for their selective operation during their movement along the two conveyer-traversing paths provided by the chain. Means for stopping the dispensing of coating composition while dispensers travel about the sprockets at the sides of the conveyer are also provided.

Mounted on the structural support of the coating device on each side of the traveling chain sprocket near its point of tangency with the path of chain travel between sprockets are fixed triggering devices to turn dispensers off as they approach a sprocket and turn selected dispensers on as they begin their travel away from a sprocket and across the conveyer. The preferred embodiment of this invention provides devices to actuate some of the dispensers during their travel along one of the transverse chain paths between the sprockets and other devices to actuate other dispensers during their travel along the other transverse chain path between the sprockets. Thus, a two-layer coating can be produced by dispensing a first coating composition from only one set of dispensers as they travel across the conveyer and dispensing a second coating composition from only one (different from the first set) set of dispensers as they travel across the conveyer on the return path of the chain spaced farther along the conveyer by a distance equal to the sprocket diameter.

The dispensers of one set are preferably mounted on the chain at locations intermediate the locations at which the dispensers of the other set are mounted. In this way some actuated dispensers are always traveling along each of the transverse paths and the potential for developing non-uniform banding in the coating produced is minimized. For example, if each set of dispensers includes four dispensers, the preferred arrangement comprises eight dispensers mounted on the chain with equal spacings between each adjacent pair of dispensers and with alternate dispensers belonging to the same set and connected to the same fluid distribution chamber.

It is possible to achieve special effects in coatings, such as graded or varied thickness films or partially comingled films, by arranging the sets of dispensers in a variety of ways other than as alternate dispensers operating on alternate halves of the cycle of travel along the path of the traveling chain. For example, it would be possible to employ a system having nine dispensers with every third dispenser in one set and the remaining dispensers in a second set.

This invention may be further appreciated with reference to a particularly preferred embodiment that is illustrated in the accompanying drawings.

DESCRIPTION OF THE PREFERRED EMBODIMENTS

Figure 1:
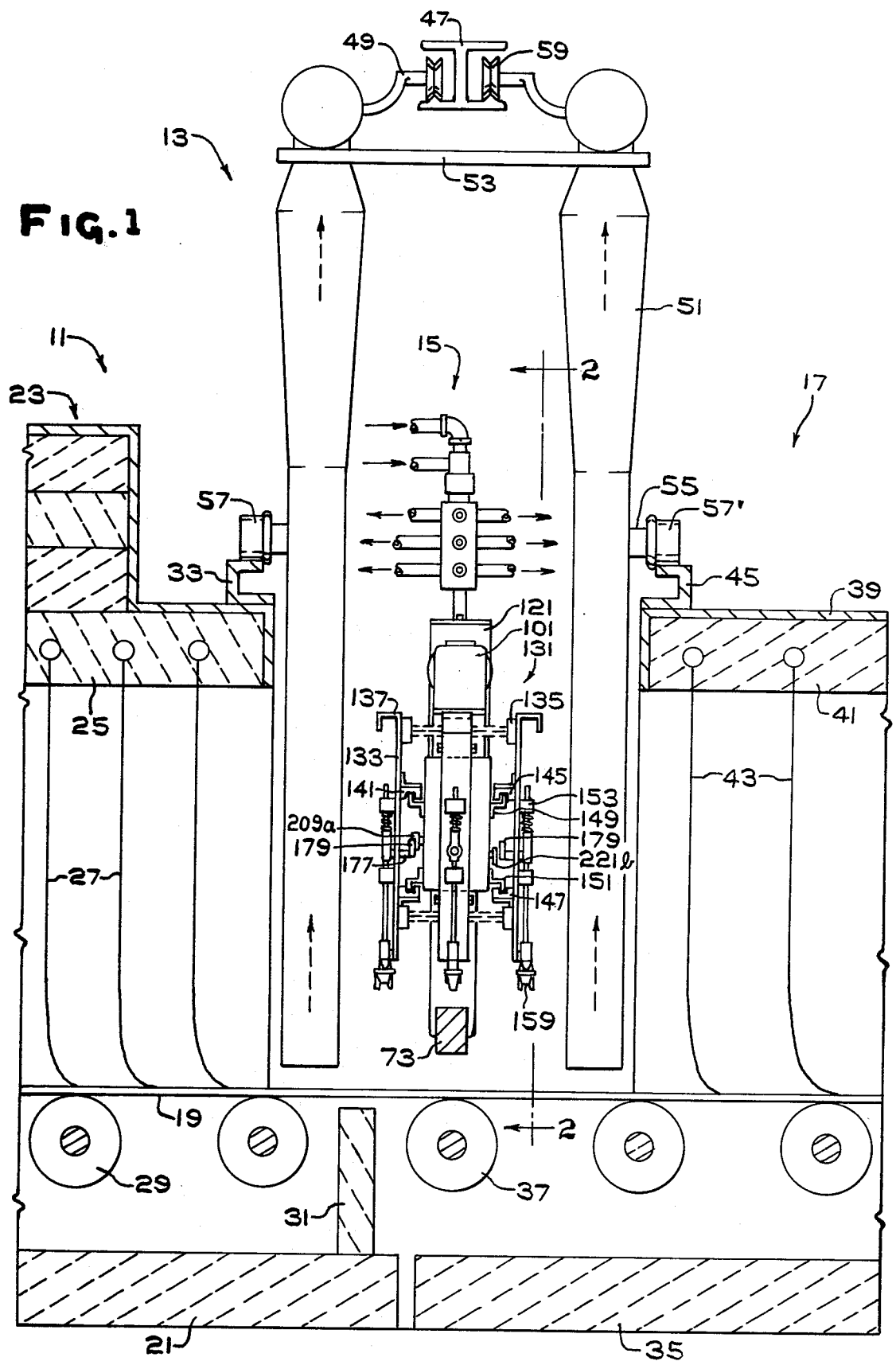
FIG. 1 is a partial, longitudinal elevation of a glass conveyer having a coating station employing the coating apparatus of this invention.

In order to appreciate this invention and its use, it is convenient to consider it in the context of the processes and apparatus in which it may be employed. Referring now to FIG. 1, there is illustrated a facility for preparing coated glass. An enclosed glass conveying facility 11 leads to a coating chamber 13 containing a coating apparatus 15. The coating chamber 13, in turn, leads to a further glass conveying facility 17. In accordance with a preferred practice, the first glass conveying facility 11 is a glass removal and conveying facility extending from a float forming chamber in which glass is formed into a continuous sheet or ribbon by flotation on molten metal, such as tin. Thus, glass entering and passing through the conveying facility 11 is sufficiently hot to provide the necessary heat for high-temperature pyrolysis of coating reactants in the coating chamber 13. In the preferred embodiments of this invention, the second glass conveying facility 17 is an annealing lehr in which glass is controllably cooled in order to anneal it and reduce internal stresses within the glass to acceptable levels for cutting and further processing of the glass. The coating chamber 13 is preferably located between a float glass forming chamber and an annealing lehr in the manner illustrated and described in U.S. Pat. No. 3,660,061 to Donley et al. Nevertheless, it should be recognized that this invention may be employed in conjunction with a process for treating discrete sheets or plates of glass that are heated in a furnace and conveyed along a conveyer through the influence of a coating chamber and then to a tempering quench or to an annealing lehr.

Referring further to FIG. 1, the various elements of the illustrated combination and their cooperation with each other may be appreciated. The first glass conveying facility 11 includes a bottom 21, an upper casing or canopy 23 which may include an insulating roof 25 and one or more sealing curtains 27. It further includes a plurality of glass conveying rolls 29 which may be at an elevation sufficient to serve as lift-out rolls for lifting and withdrawing a continuous sheet of glass 19 from a float forming chamber. The curtains 27 serve to seal and isolate the coating chamber from any preprocessing facility whether it be a furnace or a float forming chamber located upstream of the conveyer 11. The conveying facility may include a thermal barrier 31 to restrict the flow of convective air or gaseous currents beneath the glass being coated. The first portion of the conveying facility also includes a rail 33 which is employed to support an exhaust facility to be described below.

The second conveying facility 17 includes a bottom 35 in which there is mounted a series of conveyer rolls 37 for supporting and conveying glass through the coating chamber and through a rear or quench located downstream of the coating chamber. A casing 39 is provided over and surrounding the sides of the second conveyer or lehr and an insulating refractory ceiling or roof 41 is provided inside that casing. A plurality of curtains 43 are mounted in the roof 41 and serve to isolate the downstream conveyer or lehr from the coating chamber. A rail 45, like rail 33, is mounted across the top portion of the facility for supporting a coating chamber exhaust facility.

An overhead transverse structural beam with integral rails 47 is mounted above and extends across an opening between the casings 23 and 39 in order to support a removable exhaust facility which defines the coating chamber 13. The exhaust assembly includes a trolley 49 to which there are mounted exhaust ducts 51 which extend downwardly from the trolley on either end of the coating chamber. A stabilizing bracket 53 joins the exhaust ducts to maintain them in fixed spaced relationship. On each of the exhaust ducts there is provided a wheel bearing mount 55 or series of mounts 55 on which there are rotatably mounted wheels 57 and 57' which engage the rails 33 and 45 respectively to support the exhaust duct assembly. Mounted on the trolleys 49 are upper wheels 59 which engage the integral rails of the transverse overhead beam 47 to further support the exhaust duct assembly.

The entire exhaust duct assembly may be moved into or out of the space between the casing 23 an 39 so that it can alternatively be in a position over glass during coating operations or removed to the side for maintenance. The exhaust ducts are connected at their upper ends to an external exhaust facility (not shown) which is employed to discharge unwanted air and products of vaporization and reaction from the coating chamber.

Figure 2:
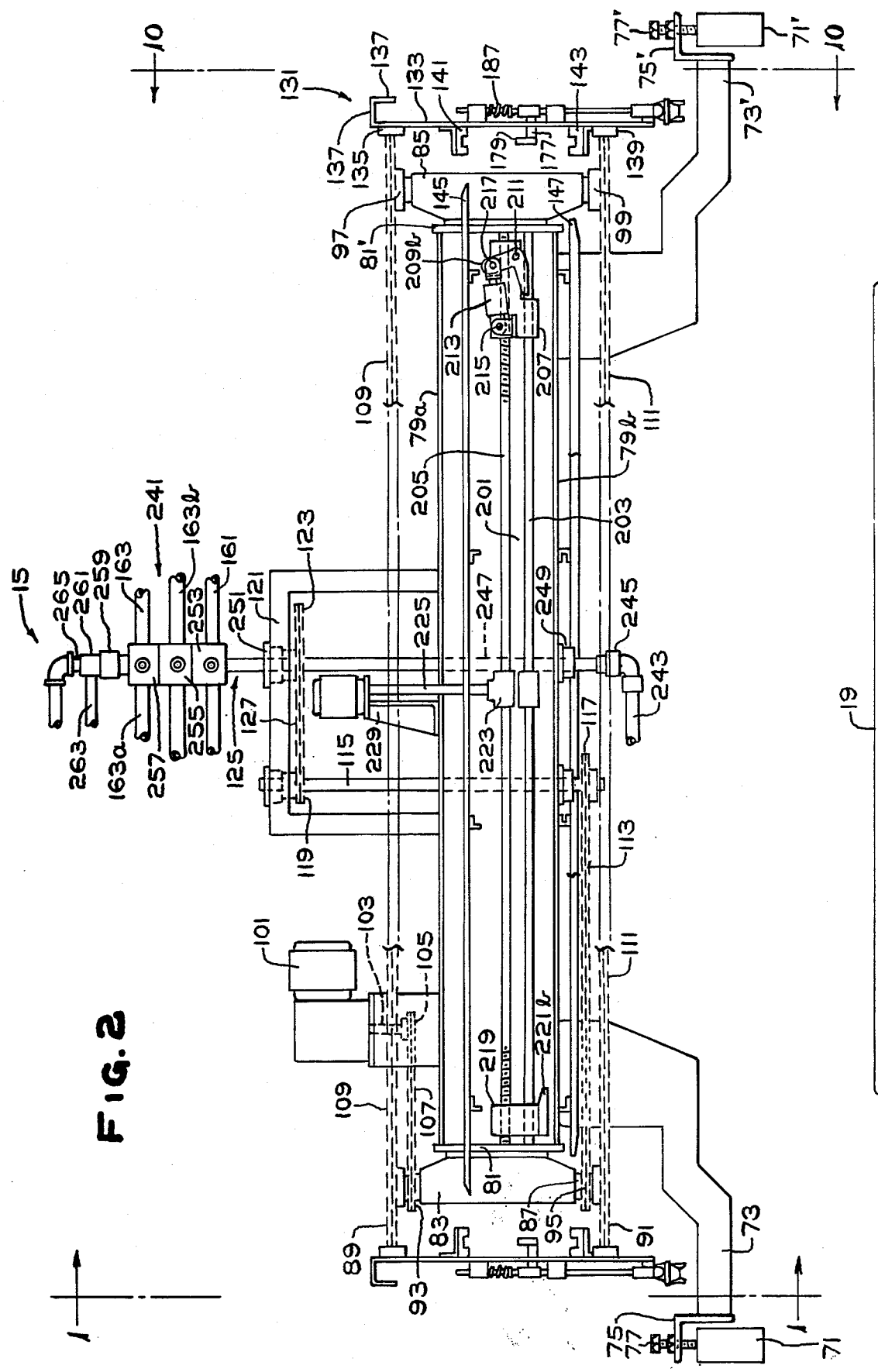
FIG. 2 is a lateral transverse elevation of the coating apparatus employed in the practice of this invention.
Figure 3:
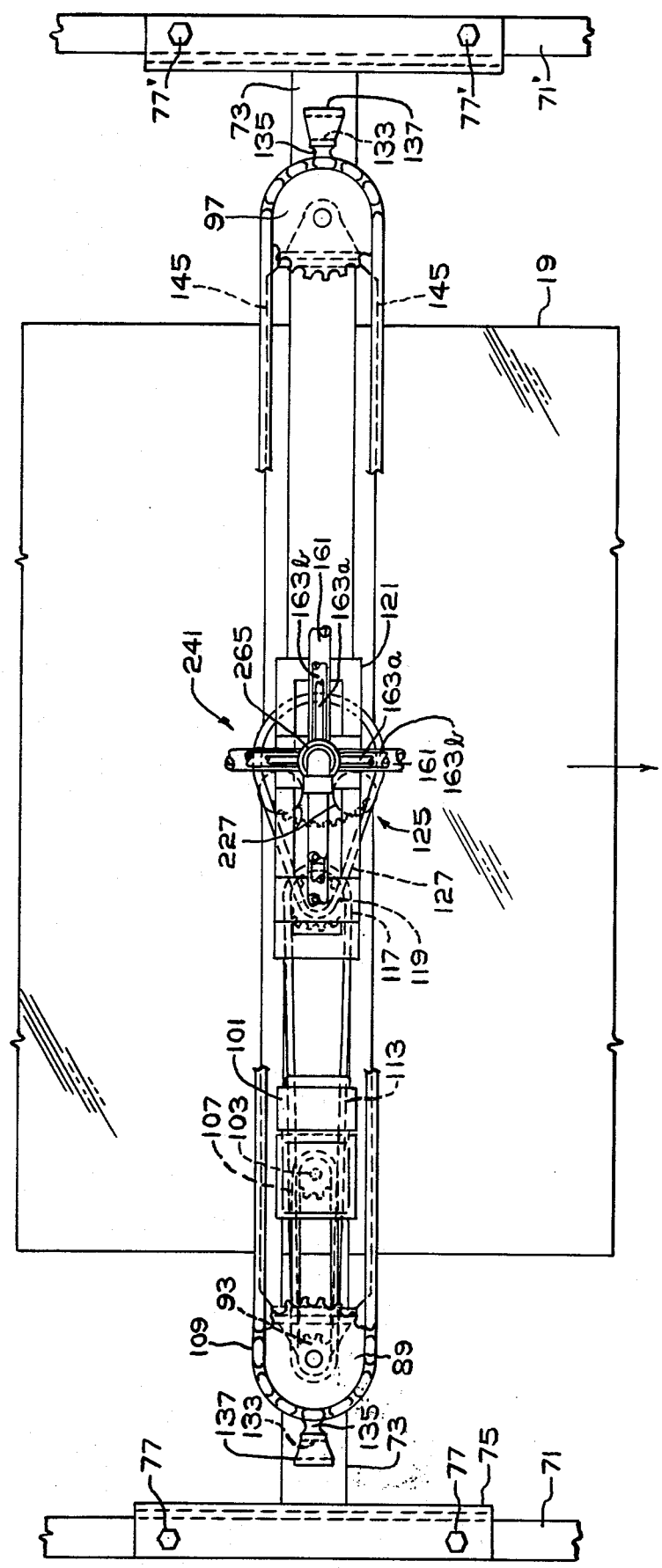
FIG. 3 is a plan view of the coating apparatus employed in the practice of this invention.
Figure 4:
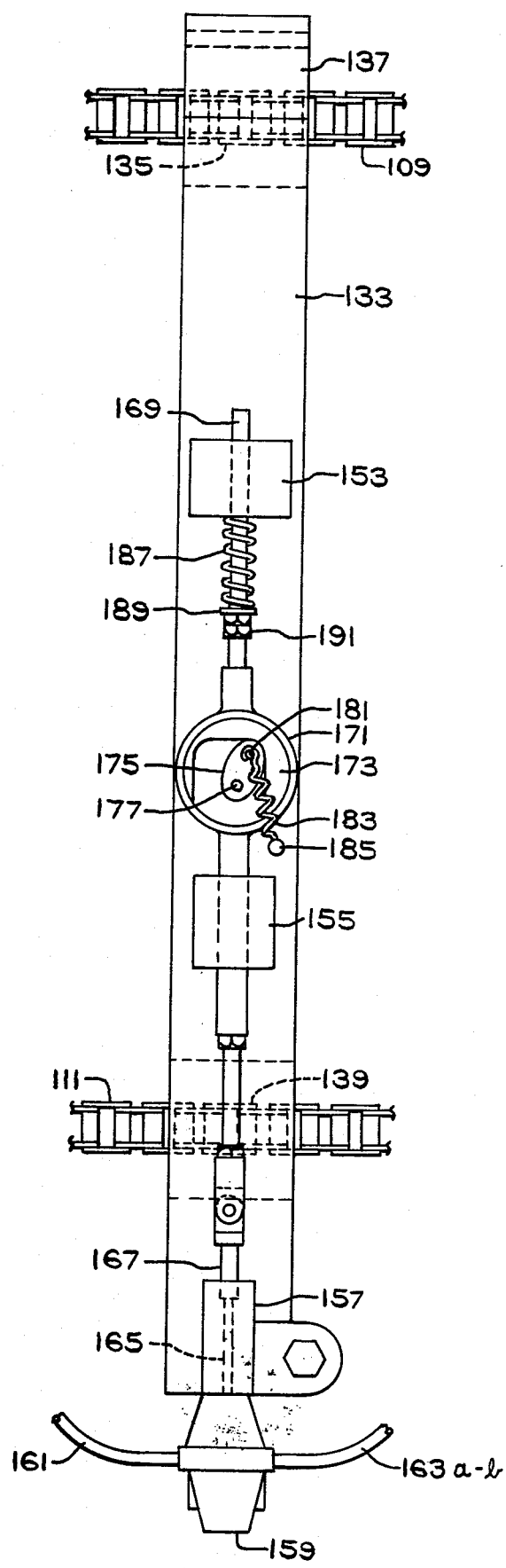
FIG. 4 is an enlarged detail view of an individual coating dispenser employed as a part of the coating apparatus according to this invention.

Referring now to FIGS. 1, 2 and 3, the overall features of the coating apparatus employed inside the coating chamber defined by the exhaust duct assembly may be appreciated. At each side of the conveyer for conveying glass through the coating chamber, there is provided a structural support 71, 71' for supporting the coating apparatus. A coating apparatus carriage frame 73 extends transversely across the conveyer from one side of the coating chamber to the other and is supported at its ends by the structural supports 71 and 71'.

It is mounted on the structural supports 71 and 71' by means of support brackets 75 and 75' to which there are extended set screw mounts 77 and 77' suitable for making minor adjustments in the elevation of the carriage frame 73. The central portion of the carriage frame 73 may be an I-beam 79 having an upper flange 79a and a lower flange 79b. The carriage frame includes end plates 81 and 81' on its transverse beam.

Chain track sprocket brackets 83 and 85 are respectively mounted on end plates 81 and 81' of the transverse beam. A sprocket shaft 87 extends vertically through the chain track sprocket bracket 83 and is rotatably mounted therein. The sprocket shaft 87 has connected to its upper end an upper chain sprocket 89 and to its lower end a lower chain sprocket 91. It further has connected to it, at its upper end just beneath the upper chain sprocket 89, an upper driven sprocket 93, and just above its lower chain sprocket 89 a lower transfer sprocket 95. At the opposite side of the assembly, mounted on a common shaft that is rotatably mounted on and extending through the chain track sprocket bracket 85, are an upper follower chain sprocket 97 and a lower follower chain sprocket 99.

A main drive motor 101 is mounted on the upper flange 79a of the transverse frame beam 79. A drive shaft 103 is connected to the main drive motor 101 and extends downwardly from it. The drive shaft 103 has connected to its lower end a drive sprocket 105. A drive chain 107 is mounted on the drive sprocket 105 and the upper driven sprocket 93 so that rotation of the drive shaft 103 is transferred to the sprocket shaft 87 and its respective sprockets. An upper track chain 109 is mounted about the upper chain sprocket 89 and the upper follower chain sprocket 97. A lower track chain 111 is mounted about the lower chain sprocket 91 and the lower follower chain sprocket 99. Thus, operation of the main drive motor 101 causes the upper and lower track chains 109 and 111 to travel synchronously about the outer perimeter of the transverse frame beam 79 along paths which traverse the width of a glass substrate conveyed beneath the frame. There are two transverse paths of chain travel spaced from one another by the diameter of the sprockets 89, 91, 97 and 99.

A transfer chain 113 is mounted about the lower transfer sprocket 95. A center drive shaft 115 is vertically mounted through the transverse beam 79 and has mounted on it at its lower end a center drive shaft lower sprocket 117 and at its upper end a center drive shaft upper sprocket 119. The transfer chain 113 is mounted about the lower sprocket 117 so that rotation of a sprocket shaft 87 caused by the main drive motor 101 results in synchronous rotation of the center drive shaft 115. An upper carriage assembly 121 is mounted on the top flange 79a of the transverse beam 79. The upper carriage assembly 121 has mounted on it a center union driven sprocket 123 surrounding the pipe of a fluid delivery system 125 (described below) and a center drive chain 127 is mounted about the upper sprocket 119 and the center union driven sprocket 123 so that the fluid delivery system 125 may be rotated synchronously with the movement of the upper and lower track chains, 109 and 111.

The coating dispensers comprise spray gun assemblies 131 mounted on the chains 109 and 111 in order to provide for transverse movement of the spray gun assemblies 131 across the width of the conveyer. The dispenser assemblies 131 comprise gun holder plates 133 which are mounted on the upper track chain 109 by an upper chain mount 135. The chain mount 135 is a conventional chain mount for connecting a device to one or more links of a chain by means of pins. A hose bracket 137 is mounted in the upper end of a gun holder plate 133 for holding fluid and air hoses going to a spray gun head mounted on the plate 133. Connected to the lower end of the gun holder plate 133 is a lower chain mount 139 which, in a manner similar to the mounting of the upper chain mount 135, is mounted on the lower track chain 111. By virtue of the described mounting facilities, the spray gun assembly gun holder plate 133 is maintained in a generally vertical plane defined by the paths of the the upper and lower track chains, 109 and 111.

Mounted on the back of the gun holder plate 133 is an upper guide rail follower 141 and a lower guide rail follower 143. Each of these followers comprises a metal bracket having a slotted block of lubricous material mounted on it with the slot of the upper guide rail follower 141 facing downwardly and the slot of the lower guide rail follower 143 facing upwardly. An upper guide rail 145 and a lower guide rail 147 are provided on each side of the transverse beam 79. These guide rails serve to engage the upper guide rail follower and the lower guide rail follower which are on each gun holder plate. The guide rails are mounted onto the transverse beam 79 by means of guide rail mounting brackets 149 and 151 respectively. The guide rails extend along that portion of the length of the transverse beam 79 between the portions of the chain sprockets which are points of tangency. The guide rails are parallel and are spaced from the transverse beam 79.

By engaging the guide rails with the guide rail followers mounted on each of the gun holder plates, the alignment of each spray gun assembly is maintained as the assembly travels in a straight line between the sprocket wheels on opposite sides of the glass conveyer. By maintaining the alignment and elevation of each spray gun assembly 131, the chains 109 and 111 are prevented from sagging between the sprocket wheels 89, 91, 97 and 99.

Mounted on the front of each gun holder plate 133 are mounting bushings 153, 155 and 157 for holding an assembly to operate an individual coating dispenser. A gun head 159 of an individual coating dispenser is mounted on the bottom portion of a gun holder plate 133. The gun head has an internal needle valve to control the flow of liquid from the gun head. The gun head 159 is provided with an inlet air hose 161 for receiving air to atomize a fluid coating material. In a preferred embodiment there is no facility on the gun head itself to close off the flow of atomizing air through the gun head. The gun head is also provided with a coating material hose 163a or b which are identical except for the fact that some of the spray gun assemblies employed in the present apparatus have hoses connected for delivering one coating material "A" and others for delivering a second coating material "B". In the discussion which follows concerning the distribution of fluid coating material, the "A" and "B" designation is employed to distinguish those guns and other facilities for dispensing a first fluid "A" from those for dispensing a second fluid "B".

Extending upwardly from the gun head 159 is a needle valve stem 165. The stem has connected to it a stem extension rod (lower part) 167. A stem extension rod (upper part) 169 is employed to further extend the stem. A cam follower ring 171 joins the two parts of the stem extension rod. The stem extension rod is translatably mounted within the bushings 153, 155 and 157 to maintain its alignment and to permit its upward and downward movement to control the position of the needle valve stem 165 and thus the needle valve inside the gun head 159.

The cam follower ring 171 has mounted within it a cam follower 173. The cam follower 173 has an opening shaped to receive an operating and locking cam 175. As will be described below, the position of the locking cam permits the upward or downward displacement of the extension rod, cam follower ring and cam follower and the needle valve stem connected to it. The operating and locking cam 175 is connected to a cam shaft 177 which extends through the gun holder plate 133 and is rotatably mounted with respect to it by passing through a lubricous bushing or through a bearing. On the backside of the gun holder plate 133 at the end of the cam shaft 177 opposite that end to which the operating and locking cam 175 is connected, there is connected to it a trigger operated cam 179. The length of the cam shaft is made to differ for different spray gun assemblies mounted on the coating apparatus in order to provide for operating such spray gun assemblies during different portions of their travel along the track chain paths.

The operating and locking cam 175 has a pin 181 connected to it and a tension spring 183 is connected to the operating and locking cam pin 181. The other end of the tension spring 183 is connected to a fixed spring pin 185 mounted on the gun holder plate 133. As will be described below, the tension spring 183 serves to hold the operating and locking cam in a fixed, stable position to one side or the other side of a null point in order to prevent the upward or downward displacement of the needle valve stem 165 and the elements associated with it absent a positive application of a force to the trigger operator cam 179 to rotate it one way or the other.

A compression spring 187 surrounds the upper part of the stem extension rod 169 and rests against the lower face of the uppermost mounting bushing 153. The other end of the compression spring 187 is engaged by a spring plate washer 189 and the degree of compression under which the spring is maintained is adjusted by the position of lock nuts 191 which are threaded onto the portion of the upper part of the stem extension rod 169 which joins the cam follower ring 171.

As previously mentioned, the position of the needle valve which controls whether or not an individual spray gun is operating to dispense a fluid coating material or operating to prevent a fluid coating material from being dispensed is controlled by the position of a trigger operator cam 179 and operating and locking cam 175 which form a part of a spray gun assembly. The following material describes a cam operator assembly 201, including elements which serve to engage the trigger operator cam 179 of a spray gun assembly to turn it causing the spray gun of that assembly to either turn on or to turn off. The cam operator assembly includes a slide rod 203 and a threaded rod 205 which extend transversely across the conveyer along the length of the transverse beam 79. Identical cam operating assemblies are provided to either side of the transverse beam 79. The slide rod 203 and threaded rod 205 are mounted at their ends to the inside faces of the end plates 81 and 81' of the transverse beam 79. The threaded rod 205, as will be described below, actually comprises two parts, each of which is rotatably mounted with respect to the end plate of the transverse beam 79. Mounted on the rods 203 and 204 to one side of the coating apparatus is a subcombination suitable for turning a gun mounted on a gun holder plate "on" when it passes the subcombination. The subcombination for turning a gun on includes an "on" operator mounting plate 207 with an "on" operator trip member 209 pivotably mounted to the plate 207 by means of a pivot pin 211. A shock absorbing air cylinder 213 is preferably connected to the "on" operator trip member, and to the "on" operator mounting plate 207. It is connected to the latter by means of a mounting pin 215 and to the former by means of connector pin 217. During operation, a trigger operator cam 179 of a spray gun assembly 131 engages a lower base of the "on" operator trip member 209 causing the operating cam to rotate and causing the "on" operator trip member 209 to rotate slightly about its pivot pin mount 211 and thereby extend the shaft of the air cylinder 213 slightly, the movement of the air cylinder shaft serving to absorb the shock of contact between the operating cam 179 and the "on" operator trip member 209.

At the other end of the transverse beam 79 a subcombination for terminating the dispensing of coating material from a spray gun is provided. The subcombination comprises an "off" operator mounting plate 219 mounted on the rods 203 and 205. It, like the subcombination for turning the gun on, is slidably mounted on rod 213 with thread mounting on rod 205. An "off" operator trip member 221 is mounted on the "off" operator mounting plate 219 at a position for engaging a trigger operator cam 179 of a spray gun assembly 131 which has the gun turned on in order to cause the operating cam to rotate to effect closure of the spray gun needle valve and effect termination of coating material dispensing.

A universal bevel gear 223 is provided for linking the two halves of the threaded rod 205. A drive shaft 225 is connected to the bevel gear in order to transmit forces to the two parts of the threaded rod 205 to rotate them about their own axes whereby the "on" operator mounting plate 207 and the "off" operator mounting plate 219 may be caused to move closer to or farther apart from one another in order to accommodate the coating of glass having different widths. The drive shaft 225 is connected to a width adjustment motor 227 which is mounted by means of a motor mount platform 229 onto the transverse beam 79. This motor 227 may be remotely controlled to vary the spacing between the "on" and "off" operator trip members and thereby control the length of the path during which a spray gun will be turned on as it travels about the entire assembly mounted on a gun holder plate connected to the chains 109 and 111.

A further detailed description of the operation of the subcombinations for turning spray guns "on" and "off" will follow a description of a fluid and air distribution assembly for transmitting fluid coating materials and air to a plurality of moving spray gun assemblies 131.

A fluid and air distribution assembly 241 is mounted in the central portion of the coating apparatus. An air inlet pipe 243 extends partially transversely along the length of the transverse beam 79 of the coating apparatus frame. It extends from a point outside of the coating chamber 13 into the coating chamber and is connected to a source of compressed air or gas or some other gas, such as nitrogen, argon and mixtures of gases, to serve as an atomizing gas for the dispensers. The air inlet pipe 243 includes an elbow and a vertical portion which is joined to a rotary union 245. A vertically disposed rotatable air pipe 249 is then connected to the rotary union 245 and rotatably mounted through a lower bearing 249 connected to the bottom flange of the transverse beam 79 and an upper bearing 251 mounted on the upper carriage assembly frame 121 which is connected to the upper flange of the transverse beam 79. Connected to the rotating air pipe 247 is an air distribution chamber 253 and connected to the air distribution chamber 253 is a fluid distribution chamber 255, which is characterized as a distribution chamber for distributing fluid "B". Connected to the fluid "B" distribution chamber 255 is a fluid distribution chamber 257 which is characterized as distribution chamber for distributing fluid "A".

Connected to the respective fluid chambers are the ends of hoses 161, 163b, and 163a, as previously described with reference to the connection of their opposite ends to spray gun heads mounted on gun holder plates 133 as part of the several spray gun assemblies 131 attached to the movable chains. Although the intermediate portions of the hoses are not illustrated, it will be appreciated that for a given number of connections on the described distribution chambers there may be a greater number or a smaller number of corresponding guns since "Y's" or "T's" may be connected intermediate between the connections for hoses on the distribution chambers and the hoses themselves.

Figure 5:
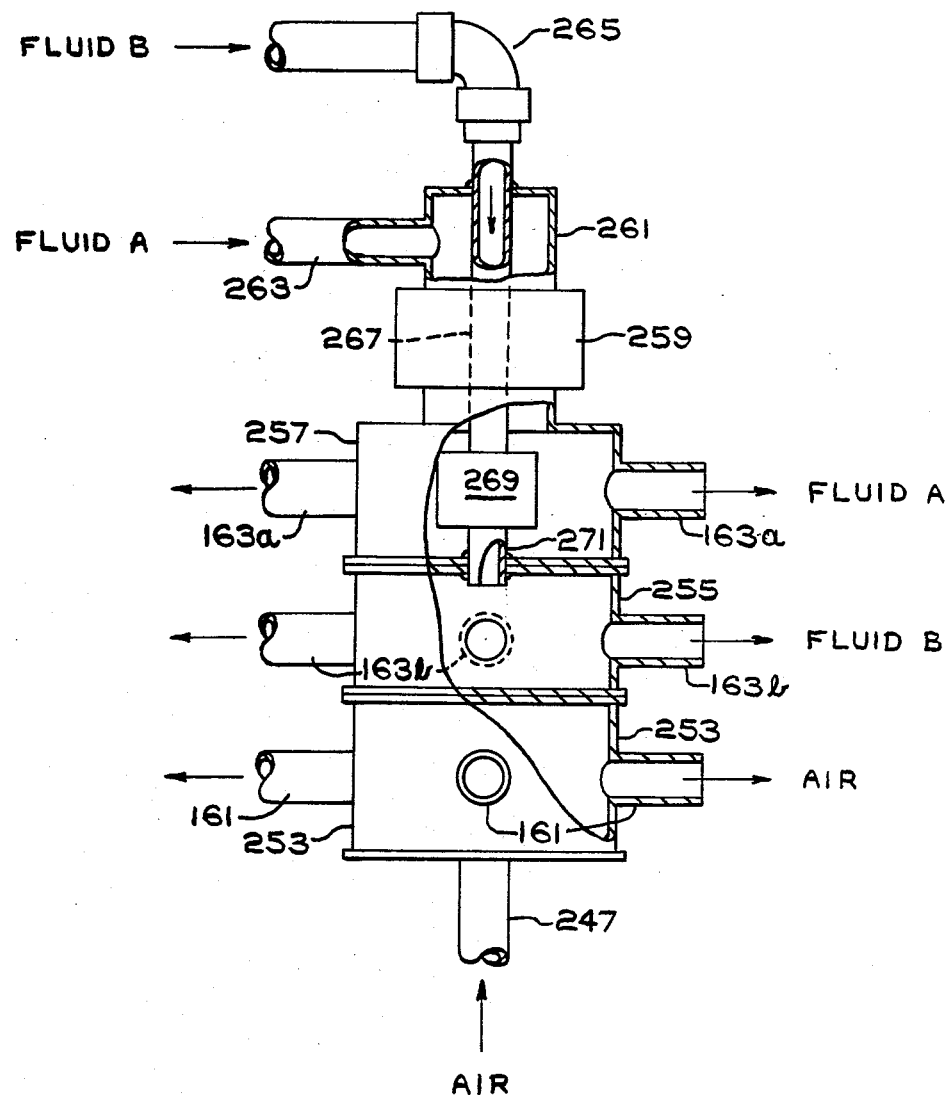
FIG. 5 is an enlarged detail (partially in section) view of the coating fluid distribution assembly employed as a part of the coating apparatus of this invention.
Figure 6:
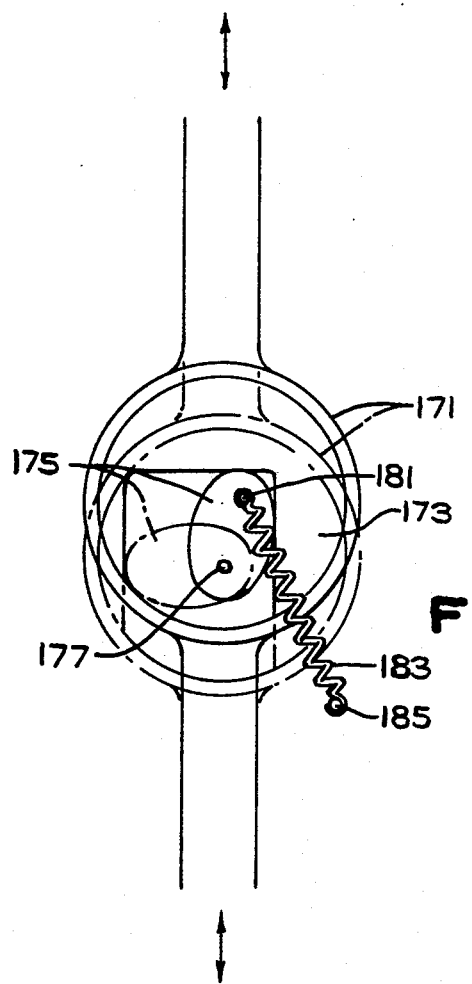
FIGS. 6, 7 and 8 are detailed views of the cam-operated trigger assembly which is a part of the coating dispensers illustrated in FIG. 4 with FIGS. 7 and 8 illustrating the operation of the cam-operated trigger assembly.
Figure 7:
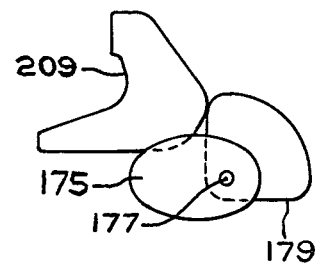
Figure 8:
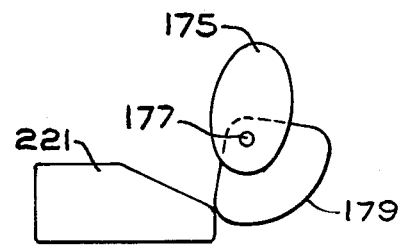

The fluid distribution system may be further understood with reference to FIG. 5. Connected to the uppermost fluid distribution chamber 257 is a rotary union 259 for fluid "A". And connected to that rotary union 259 is an annular chamber 261 for receiving fluid "A" from a fluid inlet 263 which comprises a pipe, hose or other conduit extending partially transversely across the width of the coating chamber 13 from a location outside of the chamber for connection to a source of fluid "A" (not shown). Connected to the annular chamber 261 and extending downwardly into it is a fluid inlet conduit 265 for fluid "B". This fluid inlet conduit 265, which may be a pipe or hose, also extends partially transversely across the width of the coating chamber from a location outside the chamber for connection to a source of fluid "B". An inner pipe 267 extends the fluid inlet 265 to an inner rotary union 269 for fluid "B" which is located inside the distribution chamber 257 used to distribute fluid "A". The upper part of the inner pipe 267 is fixed with respect to the annular chamber 261 and the rotary union 259 and the distribution chambers rotate freely about it. Connected to the inner rotary union 269 is a rotating inner pipe 271 which extends into the distribution chamber 255 for fluid "B" and is connected to it so that it rotates with it and the other distribution chambers.

The operation of the present coating apparatus may be appreciated with reference to the drawings already described as well as with reference to FIGS. 6 through 10 which show details in operating conditions for the described apparatus.

Spray gun assemblies travel about the path illustrated in FIG. 3. The spray gun assemblies traverse the path along which glass may be conveyed along two paths of traverse which are spaced from one another along the direction of glass conveyance approximately by the diameter of the chain sprockets. At the same time, the fluid delivery system 125, including the fluid and air distribution assembly 241 are caused to rotate synchronously with the travel of the several spray gun assemblies.

A first fluid coating composition characterized as fluid "A" is fed through conduit 263 to the fluid and air distribution assembly while a second fluid coating composition characterized as fluid "B" is fed through conduit 265 to the fluid and air distribution assembly. Air is fed through conduit 243 to the fluid and air distribution assembly. From the distribution assembly, the air is delivered to each of the guns 159 of each of the spray gun assemblies 131 through conduits 161. Throughout operation, air continues to flow through these conduits and out through the guns, whether the guns are operating to dispense a liquid or fluid coating composition or not. Fluid "A" is distributed from the distribution assembly 241 through conduit 163a to some of the spray gun assemblies characterized as the "a" assemblies. Fluid "B" is distributed through conduits 163b to other spray gun assemblies characterized as "b" spray gun assemblies. The division between "a" spray gun assemblies and "b" spray gun assemblies may vary, depending upon the particular combination of coatings desired and the relative thickness of each coating. It is possible to establish half of the spray gun assemblies as "a" spray gun assemblies and half as "b" spray gun assemblies with alternate assemblies along the chain being "a" and "b" assemblies respectively, or it is possible to have two spray gun assemblies fed with fluid "A" for every one fed with fluid "B" or any other convenient combination. It is also possible to operate with some spray gun assemblies provided with no fluid solution while others are operated with one or the other of the two coating compositions. For convenience the operations of apparatus will be described with reference to an arrangement wherein half of the spray gun assemblies are established as "a" spray gun assemblies and half are established as "b" spray gun assemblies with alternate assemblies as arranged along the length of the chain being "a" and "b" assemblies respectively.

According to this arrangement, the cam shafts 177 on the spray gun assemblies are of two different lengths with the cam shaft for the "a" guns being shorter than the cam shafts for the "b" guns by an amount slightly greater than the thickness of the trigger operator cams 179. The "on" and "off" operator trip members 209 and 221 respectively on the upstream side of the coating apparatus extend outwardly farther from the transverse beam 79 than the corresponding "on" and "off" trigger operators on the downstream side of the beam. The difference in distance to which the "on" and "off" operator trip members extend on one side relative to the other is a distance slightly greater than the thickness to a trigger operator cam.

Looking now to FIGS. 9a and 10a and 9b and 10b, the significance of the positions of the operating cams on the "a" and "b" gun assemblies respectively and the upstream and downstream sides of the coating apparatus respectively may be seen to cause one set of guns, the "a" set, to be on as they traverse the width of the glass conveyer along the upstream side of the beam 79 and off while they traverse on the downstream side of the beam.

Meanwhile, the "b" spray gun assemblies are on while traversing the glass conveyer on the downstream side of the coating apparatus and off while traversing the glass conveyer while on the upstream side of the beam 79. As seen in the drawings, the upstream side of the beam is the left side of the FIGS. 1, 9a and 9b (all taken on section line 1 in FIG. 2) and the right side as seen in 10a and 10b (all taken on section line 10 in FIG. 2) which are viewed from the opposite end of the coating assembly from the view observed in FIGS. 1 and 9a and 9b. The direction of glass substrate movement along the conveyer is noted in each of FIGS. 9a, 9b, 10a and 10b in order to orient the viewer.

Figure 9A:
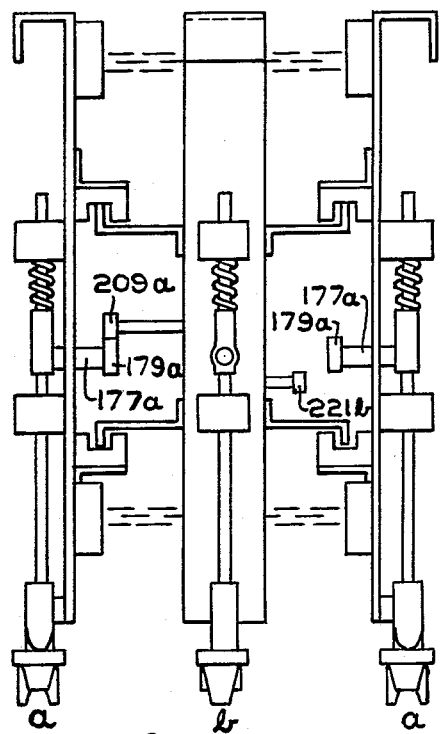
FIGS. 9a and 10a are partial, longitudinal elevations illustrating the opposite ends of the coating apparatus employed in this invention and illustrating the initiation and completion of spraying dispensing of one first coating fluid
Figure 10A:
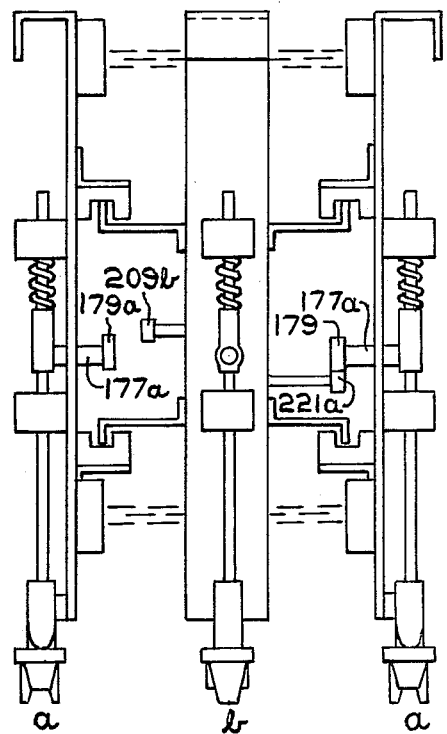

Referring specifically now to FIGS. 9a and 10a, there is shown the condition which exists at each end of the coating apparatus when "a" spray gun assemblies pass the "on" and "off" operators closest to the section lines of each drawing. In FIG. 9a it may be observed that the operating cam 179a on the gun shown on the left, which is moving away from the viewer, engages the "on" operator trip member 209a to the left in the drawing, which is on the upstream side of the coating apparatus, and that as the gun has completely traversed along the upstream side of the coating apparatus and reaches the opposite end of the glass conveyer, it is observed to engage the "off" operator trip member 221a shown to the right in FIG. 10a. Thus, the "a" spray gun is on during its traverse along the upstream side of the apparatus away from the viewer as seen in FIG. 9a and toward the viewer as seen in FIG. 10a. Meanwhile, looking at the downstream side of the coating apparatus in FIGS. 9a and 10a, which is to the right in FIG. 9a and to the left in FIG. 10a, the trigger operator cam of the "a" set of guns being mounted on a short cam shaft engages neither the "on" operator trip member 209b nor the "off" operator trip member 221b mounted on the downstream side of the coating apparatus.

Figure 9B:
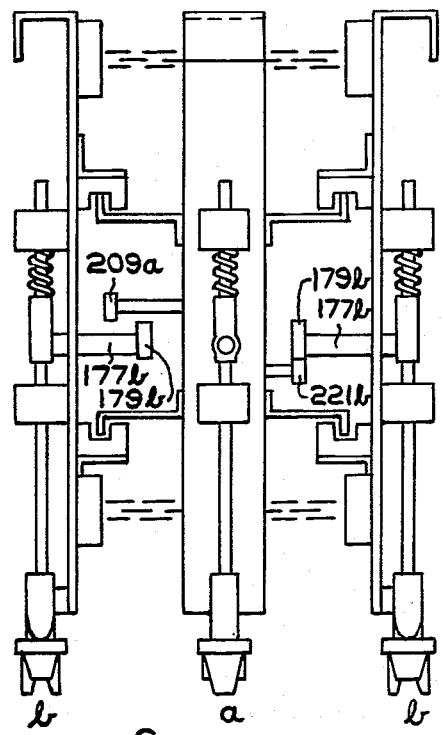
FIGS. 9b and 10b are identical to FIGS. 9a and 10a except for illustrating the initiation and completion of dispensing a second coating fluid from a separate series of coating dispensers for that fluid.
Figure 10B:
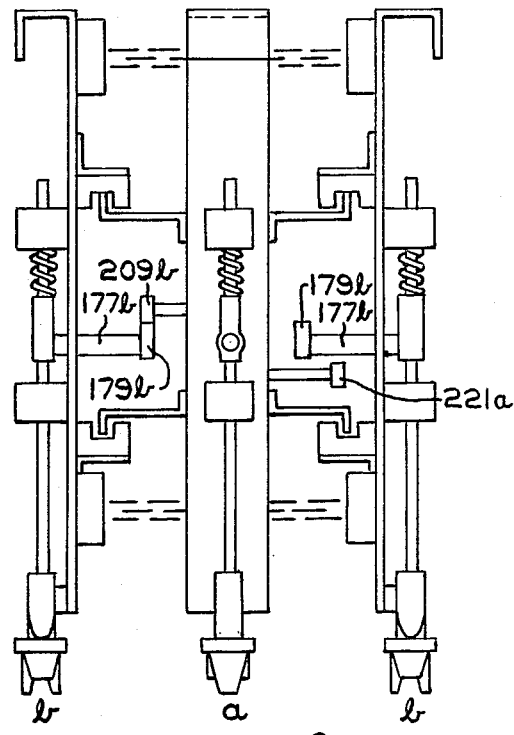

Referring now to FIGS. 9b and 10b, a complementary situation may be observed to exist with respect to "b" spray gun assemblies traversing the downstream path of the coating apparatus. The downstream side of the coating apparatus in FIG. 9b is to the right while it is to the left in FIG. 10b, since the views are looking toward one another.

In FIG. 9b it is observed that a "b" spray gun assembly coming towards the viewer on the downstream traverse engages the "off" operator trip member 221b to turn it off after its traverse of the glass conveyer along the downstream side of the coating apparatus. While the operating cam of the "b" spray gun assembly going away from the viewer in the left in FIG. 9b along the upstream traverse does not engage the "on" operator trip member 209a on the upstream side because of a lengthened cam shaft 177b permitting the trigger operator cam 179b to pass between the "on" operator trip member 209a and the traverse beam 79. Looking at the opposite end of the coating apparatus in FIG. 10b, it is seen that a "b" spray gun assembly coming towards the viewer in the right of the picture along the upstream traverse does not engage the upstream mounted "off" operator trip member 221a because its lengthened cam shaft 177b permits its trigger operator cam 179b to pass between the trip member 221a and the transverse beam. At the same time, however, the trigger operator cam 179b of the "b" spray gun assembly commencing its travel away from the viewer in the left side of FIG. 10b along the downstream traverse of the coating apparatus engages the downstream mounted "on" operator trip member 209b to turn it on to initiate spraying from the "b" spray gun assembly as it traverses the width of the glass conveyer along the downstream side of the coating apparatus.

According to the described operation, a two-film coating is produced having a film produced from the "B" composition overlying a film produced from the "A" composition.

As may be seen from the above description, it is possible when employing the apparatus described to provide spray cones or fans of coating material onto a moving glass substrate from a plurality of spray guns at two uniformly spaced lines of spray across the width of the glass substrate and at the same distance from the glass substrate. As a result, multiple-film coatings may be produced with little or no banding (regions of varying film thickness) in the coatings.

While this invention has been described with reference to particularly preferred embodiments which are illustrated herein, those skilled in the art will recognize that other obvious variants of the invention may be made which conform to the spirit and scope of this invention, including equivalents, as hereafter defined by the appended claims.

We claim:

1. In an apparatus for dispensing a coating composition onto a surface of a substrate comprising a substrate conveying means having a plane of conveyance, an endless chain in a plane substantially parallel to the plane of the conveying means, a plurality of coating dispensers mounted on the chain, each oriented for dispensing a coating composition toward the plane of the conveyer, a rotatable coating composition distributing means for distributing coating composition to each dispenser and means for driving the chain and the rotatable distributing means to cause the dispensing means to twice traverse the conveying means during a cycle of rotation along paths extending across the conveying means transverse to an intended path of substrate conveyance, the improvement which comprises means for selectively operating a first set of the plurality of dispensers to cause them to dispense a first coating composition during a first traverse of the conveying means, and means for selectively operating a second set of the plurality of dispensers to cause them to dispense a second coating composition during a second traverse of the conveyer means.

2. The apparatus according to claim 1 wherein the dispensing means of the first set of dispensing means are connected to the chain at locations intermediate the locations on the chain at which the dispensing means of the second set of dispensing means are connected.

3. The apparatus according to claim 1 wherein the means for selectively operating each set of dispensers comprises a set of trigger operating assemblies positioned for engaging trigger operated assemblies mounted on each dispenser of only one set of dispensers.

4. The apparatus according to claim 3 wherein each trigger operated assembly comprises a trigger operated cam for engaging trigger operating assemblies connected to a shaft of sufficient length to position the trigger operated cam at a location for engaging at least two trigger operating assemblies, the shaft being rotatably mounted on a dispenser holder, an operating and locking cam connected to the shaft at a location remote from the trigger operated cam, a cam follower mounted on a rod for operating the dispenser and translatably mounted on the dispenser holder, the cam follower surrounding the operating and locking cam to move translatably responsive to rotation of the operating and locking cam, and the shaft to which the cams are connected further being of sufficient length to avoid engagement between the trigger operated cam thereon and at least two trigger operating assemblies.

5. The apparatus according to claim 1 wherein the rotatable distributing means comprises a plurality of coaxial fluid distribution chambers, each having outlets for connection through flexible conduits to selected dispensers, all being commonly rotatable and each being joined through a rotary union to a fixed inlet for connection to a conduit for receiving a fluid.

6. The apparatus according to claim 1 wherein the chain to which the dispensers are connected is mounted on and travels about sprockets sized to space dispensers in opposed positions along two traversing paths between the sprockets a sufficient distance from each other to provide for the substantial absence of overlap at the surface of a substrate to be coated between compositions dispensed from such opposed dispensers.

* * * * *